US008528586B2

(12) United States Patent
Cannet et al.

(10) Patent No.: US 8,528,586 B2

(45) Date of Patent: Sep. 10, 2013

(54) ASSEMBLY INCLUDING TAP AND PROTECTIVE CAP, AND BOTTLE INCLUDING SUCH ASSEMBLY

(75) Inventors: Gilles Cannet, Parmain (FR); Renaud Ligonesche, Herblay (FR); Celine Vervin, Argenteuil (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 503 days.

(21) Appl. No.: 12/989,159

(22) PCT Filed: Apr. 10, 2009

(86) PCT No.: PCT/FR2009/050666

§ 371 (c)(1), (2), (4) Date: Oct. 22, 2010

(87) PCT Pub. No.: WO2009/136117

PCT Pub. Date: Nov. 12, 2009

(65) Prior Publication Data

US 2011/0049194 A1 Mar. 3, 2011

(30) Foreign Application Priority Data

Apr. 22, 2008 (FR) ...................................... 08 52701

(51) Int. Cl.
*F16K 1/30* (2006.01)

(52) U.S. Cl.
USPC ............ 137/382; 137/377; 220/724; 220/726

(58) Field of Classification Search
USPC .............. 137/377, 378, 382, 382.5; 220/724, 220/726
See application file for complete search history.

(56) References Cited

U.S. PATENT DOCUMENTS 1,454,367 A 5/1923 Yardley
2,234,458 A * 3/1941 Underhill ...................... 220/724

(Continued)

FOREIGN PATENT DOCUMENTS

EP 0 747 796 12/1996
EP 0 990 825 4/2000

(Continued)

OTHER PUBLICATIONS

PCT/FR2009/050666 Written Opinion dated Jan. 15, 2010.

(Continued)

*Primary Examiner* — Craig Schneider
*Assistant Examiner* — Kevin Murphy
(74) *Attorney, Agent, or Firm* — Christopher J. Cronin; Allen E. White

(57) ABSTRACT

The invention relates to an assembly including a tap for controlling fluid under pressure and a protective cap mounted around said tap, the tap including at least one handling member that includes a lever pivotably connected to the body of the tap and manually actuatable by an operator between at least a first rest position adjacent to the body of the tap and a second active position shifted by a nonzero angle relative to the body of the tap, the cap defining an inner protective space for the tap and being provided with at least one first side opening that enables movement of the lever between the first and second positions, the lever in the second position thereof intercepting the plane of the first opening and optionally projecting beyond the space of the cap, and characterized in that, in the mounted position for the use thereof, the cap is turning, that is, freely movable in rotation relative to the body of the tap around an axis, and in that the portion of the cap defining the first opening has contact edges capable of coming into contact with the lever when the latter intercepts the plane of the first opening and in that the cap is set into rotation relative to the tap, the contact edges being oriented according to predetermined angles to exert force on the lever urging the latter towards the first position thereof.

13 Claims, 2 Drawing Sheets

(56) References Cited

U.S. PATENT DOCUMENTS

| | | | | |
|---|---|---|---|---|
| 3,373,894 | A | 3/1968 | Johnson | |
| 3,648,885 | A * | 3/1972 | Kitsuda | 220/727 |
| 3,776,412 | A * | 12/1973 | Mink | 220/726 |
| 4,332,331 | A * | 6/1982 | Fawley | 220/726 |
| 5,975,121 | A | 11/1999 | Arzenton et al. | |
| 6,311,722 | B1 * | 11/2001 | Gounot et al. | 137/382 |
| 2005/0173007 | A1 | 8/2005 | Cannet et al. | |
| 2010/0155405 | A1 | 6/2010 | Lang et al. | |

FOREIGN PATENT DOCUMENTS

| | | |
|---|---|---|
| EP | 1 426 663 | 6/2004 |
| FR | 2 774 452 | 8/1999 |
| FR | 2 793 297 | 11/2000 |
| FR | 2 803 366 | 7/2001 |
| FR | 2 828 922 | 2/2003 |
| FR | 2 840 664 | 12/2003 |
| FR | 2 898 176 | 9/2007 |

OTHER PUBLICATIONS

French Search Report for FR 0852701 dated Sep. 16, 2008.

International Search Report for PCT/FR2009/050666, mailed Jan. 15, 2010.

* cited by examiner

ASSEMBLY INCLUDING TAP AND PROTECTIVE CAP, AND BOTTLE INCLUDING SUCH ASSEMBLY

CROSS-REFERENCE TO RELATED APPLICATIONS

This application is a §371 of International PCT Application PCT/FR2009/050666, filed Apr. 10, 2009, which claims §119 (a) foreign priority to French application 0852701, filed Apr. 22, 2008.

BACKGROUND

1. Field of the Invention

The present invention concerns an assembly including a tap and a protective cap, and a bottle including such an assembly.

2. Related Art

The invention concerns more particularly an assembly including a tap for controlling fluid under pressure and a protective cap mounted around said tap, the tap including a body having a vertical axis and an internal fluid distribution circuit between an inlet adapted to be connected to a fluid source such as a bottle and a fluid outlet, at least one element for controlling the flow of fluid situated in the internal circuit and at least one handling member that includes a lever pivotably connected to the body of the tap and manually operable by an operator between at least a first or rest position adjacent to the body of the tap and a second or active position shifted by a non-zero angle relative to the body of the tap, the cap defining an inner protective space for the tap and being provided with at least one first lateral opening that enables movement of the lever between the first and second positions, the lever in the second position thereof intersecting the plane of the first opening and optionally projecting beyond the volume of the cap.

The invention notably concerns a system for delivering gas from a bottle, in particular a bottle of small volume (10 liters of geometrical volume containing gas compressed to 150 to 300 bar, for example).

The invention applies notably to bottles provided with a tap easily connectable to pressure regulators of various types and (the tap) providing an emergency stop (or at least quick stop) function for stopping dispensing the gas and giving a visible indication as to the “on” or “off” state of the tap.

One such tap is described for example in the documents FR-A1-2828922 and FR-A1-2793297 (the invention may be applied to any other type of tap and is in no way limited to the examples described in the above documents).

Thus the invention also concerns a protective cap, preferably of composite material, having an opening enabling manipulation of a lever for operating the tap, the tap nevertheless being sufficiently encompassing to protect the tap in the event of the bottle falling over, for example.

A tap having at least one lever possibly projecting out of the protection volume provided by the cap offers better visibility and better maneuverability for an operator. However, in this case there is a risk of impact and of breakage, notably in the event of the combination falling over. The document EP 747 796 describes such an assembly in which the cap is mounted on the bottle in a particular fixed indexed angular position relative to the tap.

In some applications it is preferable to provide a cap that turns relative to the tap and to the bottle, to offer the user some freedom and to facilitate installation, maintenance and connection to the tap. In the position of use a rotary tap is mounted “idle” i.e. free to rotate relative to the combination of the tap and the bottle. In other words the user can chose the angular position of the cap (turn it) without having to demount it (it is nevertheless still locked against movement in translation).

A rotary cap is notably advantageous when installing the tap on the bottle because it necessitates no angular indexing between the tap and the cap. Being able to orient the (rotary) cap relative to the fixed tap also increases convenience in use, for example for connecting to a pressure regulator or a hose. Finally, to verify the state of the tap and/or to maintain it, being able to turn the cap makes it possible to examine the tap and its connection to the bottle from all angles and facilitates intervention.

With a rotary cap there is a risk of collision between the cap and the lever when transporting the bottle or if it falls over, for example.

One possible solution is to limit the rotation of the cap by stops and/or to reinforce the lever and/or to provide for the remaining part of the broken lever to be of sufficient size for the tap to be operated anyway.

These solutions are nevertheless complex or costly or limit the ergonomics and use of the corresponding bottles.

SUMMARY OF THE INVENTION

An object of the present invention is to alleviate some or all of the above drawbacks of the prior art.

To this end, the assembly of the invention, otherwise conforming to the generic definition thereof given in the above preamble, is essentially characterized that the cap is mobile in rotation relative to the body of the tap about a vertical axis, the portion of the cap defining the first opening has contact edges capable of coming into contact with the lever when the latter intersects the plane of the first opening and the cap is set into rotation relative to the tap, the contact edges being oriented according to predetermined angles to exert a force on the lever urging the latter towards the first position thereof.

Moreover, embodiments of the invention may include one or more of the following features:

- at least part of the contact edges have an orientation inclined relative to the vertical axis,
- at least part of the contact edges are curved or inclined toward the interior of the first opening,
- in a vertical plane, the contact edges have a portion inclined at an angle between 14 and 30 degrees inclusive and preferably between 17 and 25 degrees inclusive relative to the vertical axis,
- the first opening is delimited on its circumference by substantially vertical lateral members, a substantially horizontal upper member and a substantially horizontal lower member, the contact edges being situated on the lateral members and/or on the upper member,
- the cap includes at least one second and one third lateral opening having dimensions not enabling complete movement of the lever between the first and second positions and preventing the mounting of a pressure regulator on the tap via these at least one second and third openings,
- the cap is open in its upper part,
- the cap includes a fourth lateral opening provided for access to the tap, notably to a fluid outlet connector of the tap and/or a pressure indicator,
- the cap consists of charged plastic material, such as polyamide (for example GRILON), polyester (for example YTREL from Du Pont) or polybutylene tetraphtalate (PBT) (for example VALOX from General Electric), said members delimiting the openings are produced in one piece (integrally) with the body of the cap, the element for controlling the flow of fluid controlled by the articulated lever comprises an isolating valve.

The invention may also concern a pressurized fluid bottle, notably for a gas containing nitrogen, characterized in that an assembly according to any of the preceding claims is mounted at its orifice, the tap being mounted on, for example screwed to, the bottle in such manner that it cannot rotate thereon, and the cap is mounted to rotate freely relative to the vertical axis of the bottle and the tap via a rotary fixing system such as a circlip cooperating with a groove.

The invention may also concern any alternative device or method comprising any combination of the above features or features disclosed hereinafter.

BRIEF DESCRIPTION OF THE FIGURES

Other features and advantages will appear on reading the following description given with reference to the figures, in which.

DETAILED DESCRIPTION OF THE INVENTION

Figure 1:
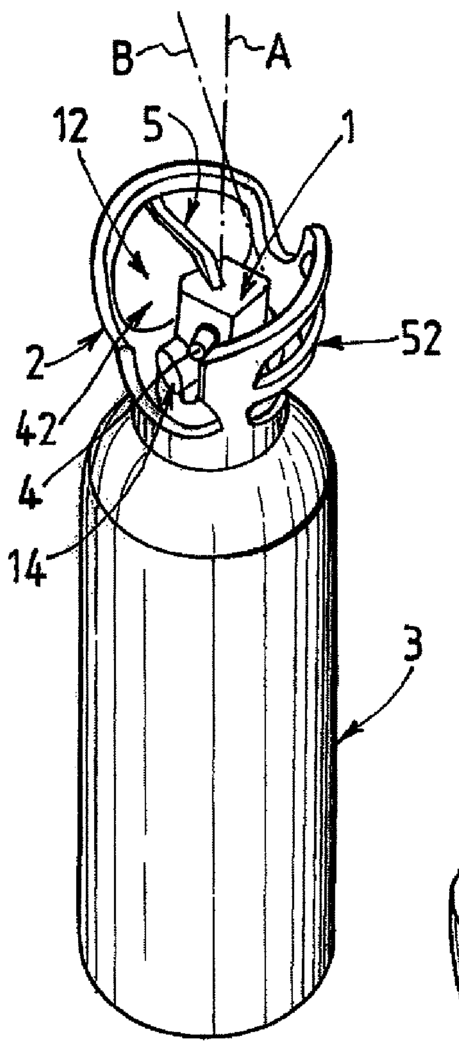
FIG. 1 is a perspective view of a pressurized fluid bottle provided with a tap and a protective cap of one embodiment of the invention.
Figure 2:
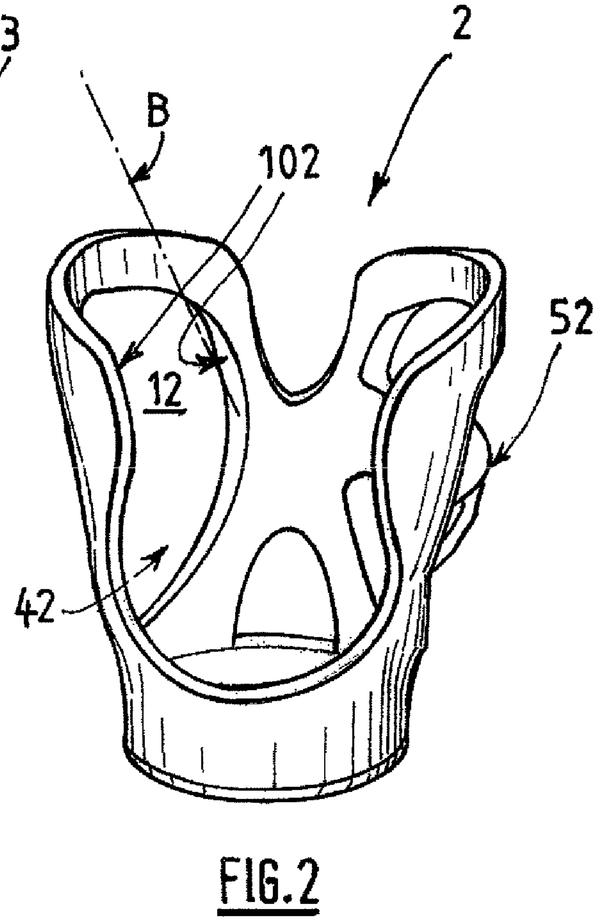
FIG. 2 is a perspective view of the cap of the assembly from FIG. 1, FIGS. 3 to 5 are side views of the upper part of the assembly from FIG. 1 seen in three different directions.

The device shown in FIG. 1 comprises a pressurized gas bottle 3 in the orifice of which is mounted (for exampled screwed) a tap 1 provided with a pivoting lever 5 (for operating a valve or an isolating valve, for example).

The lever 5 is for example articulated to the upper part of the tap 1 and can be moved manually between a position near the body of the tap 1 on one lateral face of the tap (valve closed) and a position moved away through a non-zero angle (valve open). Of course, the lever 5 may have other intermediate positions (valve open or closed).

On another of its lateral faces the tap 1 may include a pressure gauge 14 (or an outlet able to receive such a gauge) and an outlet connector 4 (intended to be connected to a hose, for example).

A cap 2 is mounted around the tap 1 so that it can turn. In other words the cap 2 is connected in translation to the bottle 3 but can turn relative to the bottle about the vertical axis A of the bottle 3 and the tap 1. The cap 2 can preferably turn freely through 360° about the tap 1.

The cap 2 may comprise a structure forming two substantially vertical “arches” (or lobes) on two lateral flanks of the cap 2.

A first arch defines a first lateral opening 12 intended to be disposed facing the lever 5. The second arch defines a second lateral opening 22 and a third lateral opening 32.

Figure 3:
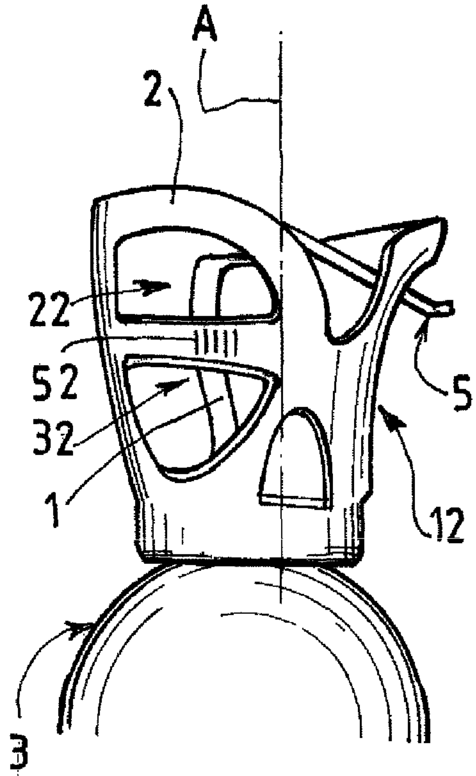
Figure 4:
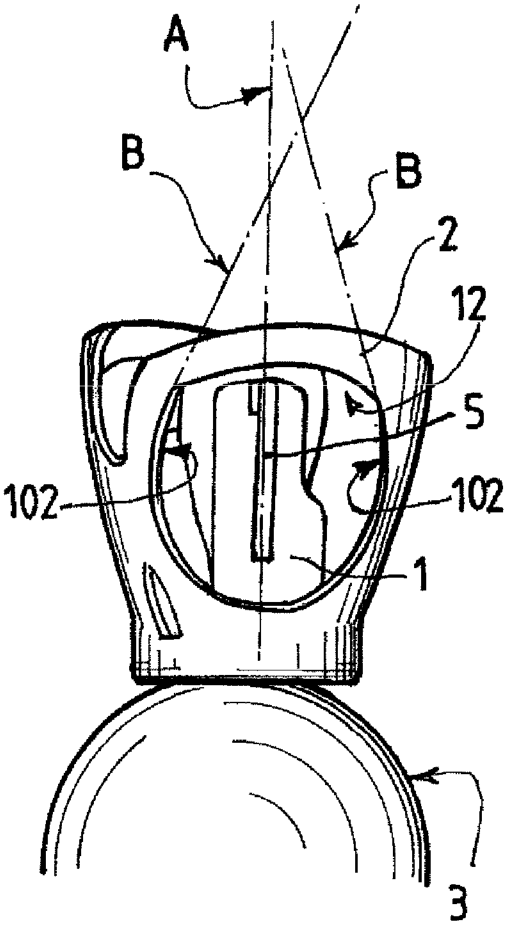
Figure 5:
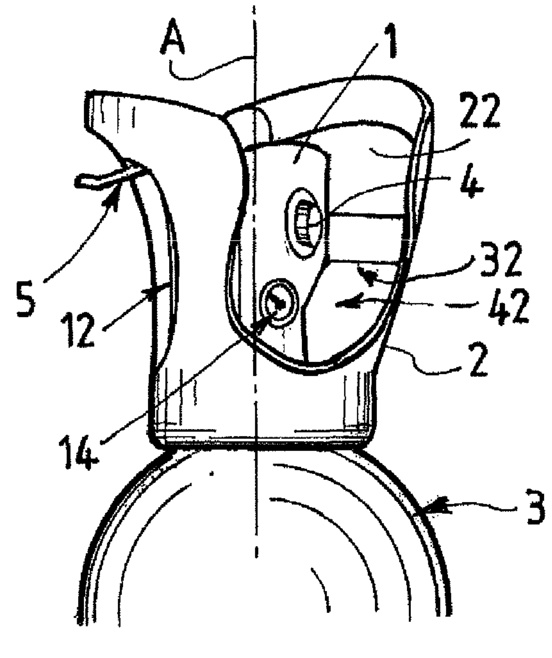

When the lever 5 is facing the first opening 12, outward pivoting of the lever is possible between two extreme positions. In its away position the lever 5 intersects the imaginary plane of the first opening 12 and possibly projects beyond the volume of the cap 2 (see FIGS. 1 and 3).

In this raised position of the lever 5, if the cap 2 is pivoted (if the cap is manipulated or the bottle falls over, for example), the portion of the cap 2 delimiting the first opening 102 may come into contact with the lever 5 at the level of edges 102 called contact edges.

According to the invention, these contact edges 102 are oriented at predetermined angles to induce in this event a force on the lever 5 urging it toward its down position (i.e. toward the body of the tap 1).

In this way, rotation of the cap 2 when the bottle is in use (with the lever 5 raised) causes (or at least encourages) the closing of the lever 5 mechanically and automatically. This closing is a result of the predetermined particular shape of the members of the first opening 12 through which the lever 5 is normally maneuvered (raised to open the valve, lowered to close the valve).

For example, at least part of the contact edges 102 may have an orientation B inclined relative to the vertical axis A and/or at least part of the contact edges 102 are curved or inclined toward the interior of the first opening and/or the contact edges 102 may have a portion inclined at an angle between 14 and 30 degrees inclusive and preferably between 17 and 25 degrees inclusive relative to the vertical axis A. The inclined portion may be included in a curve, for example a circular segment. In the area of contact between the lever and said curve, the tangent to the curve is preferably at an angle to the vertical axis at least equal to the lowest of the limits described above.

The second opening 22 and the third opening 32 are disposed one (22) above the other (32) and separated by the horizontal member 52, which may form a holding member of the bottle 3.

The dimensions of the second opening 22 and the third opening 32 (and the horizontal member 52) are preferably chosen to prevent the lever 5 from being able to pivot on this side. The dimensions of the second opening 22 and the third opening 32 are also chosen to make it impossible (or difficult) to mount an pressure regulator on the filling connector 4 when the latter is facing the second arch.

The cap 2 further comprises a fourth opening 42 situated on a lateral face between two adjacent ends of two arches. The fourth opening 42 (which is preferably open at the top) is provided to offer sufficient access to the face of the tap 1 fitted with the gauge 14 and the outlet connector 4 (with a view to mounting a pressure regulator) and possibly a filling connector (not shown).

To guarantee that the lever 5 is actually in the area or areas of the cap 2 that protect(s) it, the cap 2 is preferably conformed to allow use of the tap of the bottle 3 only in a finite sector of angular positions of the cap 2 relative to the tap 1. For the remaining angular positions the cap 2 may be sized either to prevent complete pivoting of the lever 5 or to prevent the connection of a pressure regulator (or other unit) to the outlet connector 4.

Thus although some of the positions of the cap 2 relative to the tap 1 do not protect the lever 5, the cap 2 is conformed to prevent correct use of the tap 1 in these positions (i.e. the lever 5 cannot be raised correctly or a pressure regulator cannot be connected).

The cap 2 is preferably produced in plastic and is relatively elastic in the event of an impact.

The cap 2 also has a lightweight structure enabling protection of the cap 1 without using a large quantity of material (advantageous cost and mass).

This very open architecture also ensures good visibility of the interior of the protected volume.

The invention applies notably to multiple use portable gas bottles (notably for professional mobile applications) for which a pressure gauge incorporated in the tap is not necessarily provided because of too great a range of adjustment of pressure or flow rate for example or because of requirements that vary from one use to another (requiring control of either flow rate or pressure).

The invention may be applied to nitrogen bottles for installing air conditioning systems, for which the required pressure can vary between 1 bar and 50 bar, depending on whether it is a question of inserting pipes, filling a circuit or verifying a seal, and depending on the type of system.

The invention may also be applied to bottles used in a high-pressure circuit (power station, backup power supply, safety devices) with no directly connected pressure regulator.

The invention may nevertheless also be applied to taps with an integral pressure regulator.

The invention may where appropriate concern some or all of the technical features of the cap independently of the tap.

Moreover, the technical features of the cap 2 may be produced by conferring on the cap 2 other shapes/arrangements, on the understanding that, in all cases (including the example shown), the features of the invention are independent of the esthetic appearance of the cap.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An assembly including a tap for controlling fluid under pressure and a protective cap mounted around said tap, the tap including a body having a vertical axis and an internal fluid distribution circuit between an inlet adapted to be connected to a fluid source such as a bottle and a fluid outlet, at least one element for controlling the flow of fluid is situated in the internal circuit and at least one handling member includes a lever pivotably connected to the body of the tap and manually operable by an operator between at least a rest position adjacent to the body of the tap and an active position shifted by a non-zero angle relative to the body of the tap, the cap defines an inner protective space for the tap and is provided with at least one first lateral opening that enables movement of the lever between the rest and active positions, when in the active position the lever intersects the plane of the first opening and optionally projects beyond the volume of the cap, wherein:

in the mounted position for the use therefore, the cap freely rotatably mobile relative to the body of the tap about the vertical axis, the portion of the cap defining the first opening has contact edges adapted to come into contact with the lever when the latter intersects the plane of the first opening and the cap is set into rotation relative to the tap, and the contact edges are oriented according to predetermined angles to exert a force on the lever urging the lever towards the rest position.

2. The assembly of claim 1, wherein at least part of the contact edges have an orientation inclined relative to the vertical axis.

3. The assembly of claim 1, wherein at least part of the contact edges are curved or inclined toward the interior of the first opening.

4. The assembly of claim 1, wherein, in a vertical plane, the contact edges have a portion inclined at an angle of 14-30 degrees.

5. The assembly of claim 4, wherein, in a vertical plane, the contact edges have a portion inclined at an angle of 17-25 degrees.

6. The assembly of claim 1, wherein the first opening is delimited on its circumference by substantially vertical lateral members, a substantially horizontal upper member and a substantially horizontal lower member, the contact edges being situated on the lateral members and/or on the upper member.

7. The assembly of claim 1, wherein the cap includes at least one second lateral opening having dimensions preventing complete movement of the lever between the rest and active positions and preventing mounting of a pressure regulator via the at least one second opening.

8. The assembly of claim 1, wherein an upper part of the cap is open.

9. The assembly of claim 1, wherein the cap includes a fourth lateral opening provided for access to the tap.

10. The assembly of claim 9, wherein the fourth lateral opening provides access to a fluid outlet connector of the tap and/or a pressure indicator.

11. The assembly of claim 1, wherein the cap is made of a charged plastic material selected from the group consisting of polyamide, polyester, and polybutylene tetraphthalate.

12. A pressurized fluid bottle having an orifice, wherein:

the assembly of claim 1 is mounted at the orifice, the tap is mounted on the bottle such that the tap cannot rotate thereon, and the cap is mounted to rotate freely relative to the vertical axis of the bottle and the tap.

13. The pressurized fluid bottle of claim 12, wherein said bottle contains nitrogen.

* * * * *